United States Patent [19]

Govaert

[11] 4,267,452

[45] May 12, 1981

[54] RADIOACTIVITY DISTRIBUTION DETECTION SYSTEM AND CRYSTAL DETECTOR ASSEMBLY

[75] Inventor: Johan A. Govaert, Peabody, Mass.

[73] Assignee: Baird Corporation, Bedford, Mass.

[21] Appl. No.: 61,984

[22] Filed: Jul. 30, 1979

[51] Int. Cl.³ ............................................... G01T 1/20
[52] U.S. Cl. .................................. 250/366; 250/363 S; 250/367; 250/368
[58] Field of Search .................... 250/363 S, 366, 367, 250/369, 368

[56] References Cited

U.S. PATENT DOCUMENTS

| | | | |
|---|---|---|---|
| 3,594,577 | 7/1971 | Loveday | 250/363 S |
| 3,937,964 | 2/1976 | Muehllehner | 250/363 S |
| 4,044,332 | 8/1977 | Grenier | 250/369 |
| 4,053,774 | 10/1977 | Berdahl | 250/367 |

*Primary Examiner*—Davis L. Willis

*Attorney, Agent, or Firm*—Morse, Altman, Oates & Dacey

[57] ABSTRACT

A crystal detector array, particularly for a high resolution radioactivity distribution detection system, with a plurality of crystal assemblies that are disposed in rows and columns and define a sensing array. Each crystal assembly is provided with four sensing heads. Each head is a quadrant of the crystal assembly and is identified by a unique address location in the array. A plurality of detectors are superimposed on the sensing array. Certain ones of the detectors are in registration with one sensing head of four crystal assemblies in adjacent rows and columns. Radioactive events emitted from a subject under diagnosis activate selected ones of the sensing heads. Light signals generated by the activated heads are detected by the detectors and processed to provide a presentation of radioactivity distribution within the subject under diagnosis.

10 Claims, 4 Drawing Figures

RADIOACTIVITY DISTRIBUTION DETECTION SYSTEM AND CRYSTAL DETECTOR ASSEMBLY

BACKGROUND OF THE INVENTION

1. Field of Invention

The present invention relates to detecting systems and, more particularly, is directed towards radioactivity detection systems and detectors therefor.

2. Description of the Prior Art

Various types of radioactivity distribution systems have become known in the art for determining the location of radioactive material injected in diagnostic amounts into a human body or the like. These systems utilize an array of scintillators for sensing radioactive events within the body and a plurality of photomultiplier tubes that are coupled to the scintillators for detecting the sensed events. The address location for each activated scintillator is linearly encoded and then processed to provide a pictorial representation of the relative radioactive event levels detected by the scintillators. Spatial resolution is limited by the smallest diameter of availble photomultiplier tubes. Such systems have suffered from the disadvantages that linear encoding of scintillator address locations requires an excessive number of photomultiplier tubes in order to provide each scintillator with a unique address location. A large number of photomultiplier tubes increases the system costs and increases the likelihood for system downtime. Such systems also suffer from the disadvantage that the dark current of the photomultiplier tubes causes pulses (dark noise) which, in certain instances, are incorrectly interpreted as valid scintillations. A need has arisen for an improved radioactivity distribution detection system which does not suffer from the heretofore mentioned disadvantages.

SUMMARY OF THE INVENTION

It is an object of the invention to provide a crystal detector assembly which does not suffer from the foregoing disadvantages.

Another object of the invention is to provide a crystal detector assembly for detection of radioactive events.

A further object of the invention is to provide a crystal detector assembly and system for presentation of radioactive event distributions.

Still a further object of the invention is to provide a crystal detector array, particularly for a high resolution radioactivity distribution detection system, for determining the location and distribution of radioactive events emitted from a subject under diagnosis into which a diagnostic amount of radioactive material has been injected. The radioactive events are sensed by a plurality of crystal assemblies that are arranged in an array of rows and columns. Each crystal assembly has four sensing heads at one end and a light transmitting section for each head at any opposite end. A plurality of detectors, such as photomultiplier tubes, are superimposed on the crystal array in such a manner that one photomultiplier tube is positioned over one light transmitting section of four crystal assemblies in adjacent rows and columns. Signals generated by a photomultiplier tube monitoring an activated sensing head and by photomultiplier tubes monitoring sensing heads adjacent the activated sensing head are processed for generating data signals defining an address location of the activated sensing head, each sensing head having a unique address location. The data signals are processed for presentation of the radioactivity distribution within the subject under diagnosis.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
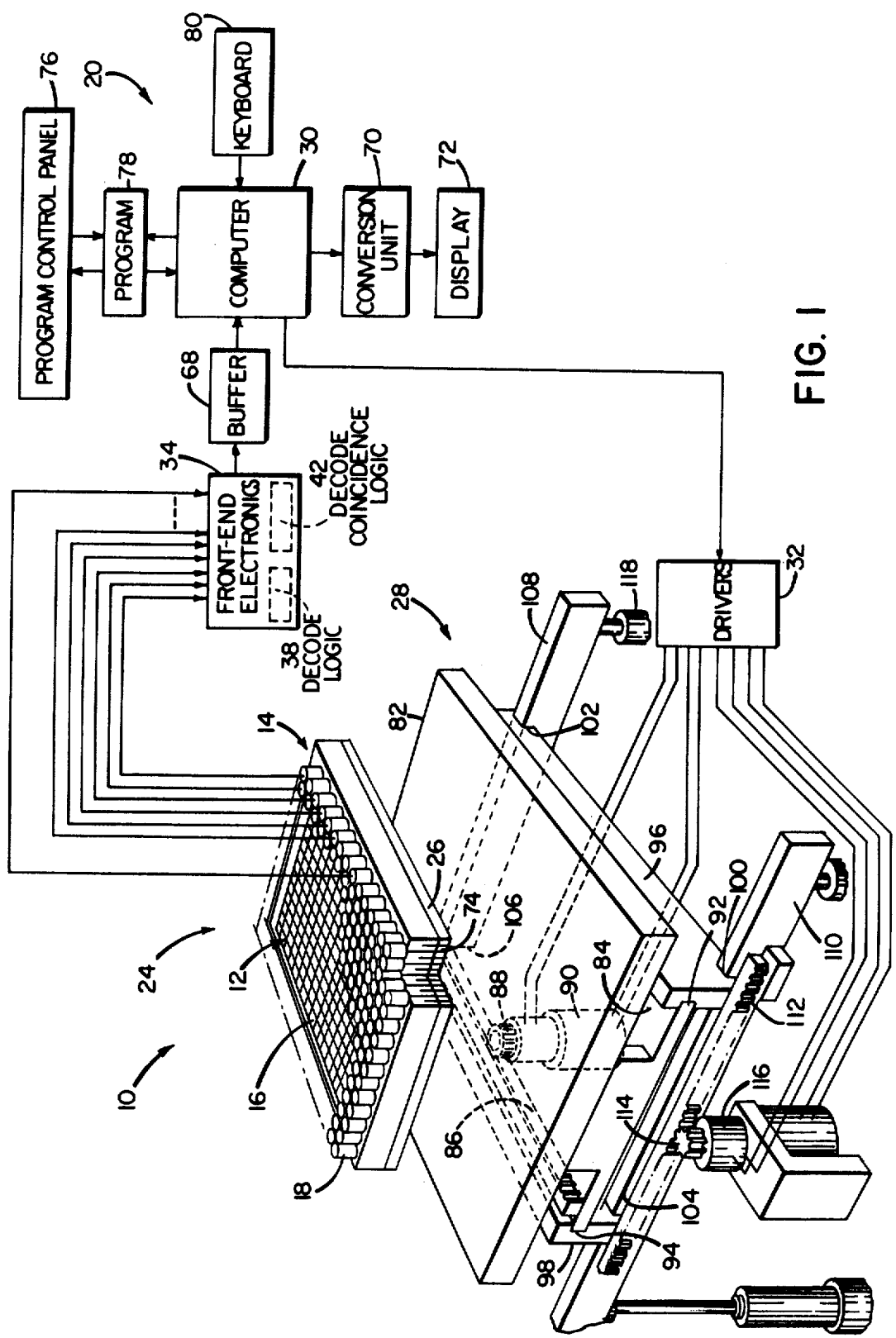
FIG. 1 is a block and schematic diagram of a high resolution radioactivity distribution detection system embodying the present invention.
Figure 2:
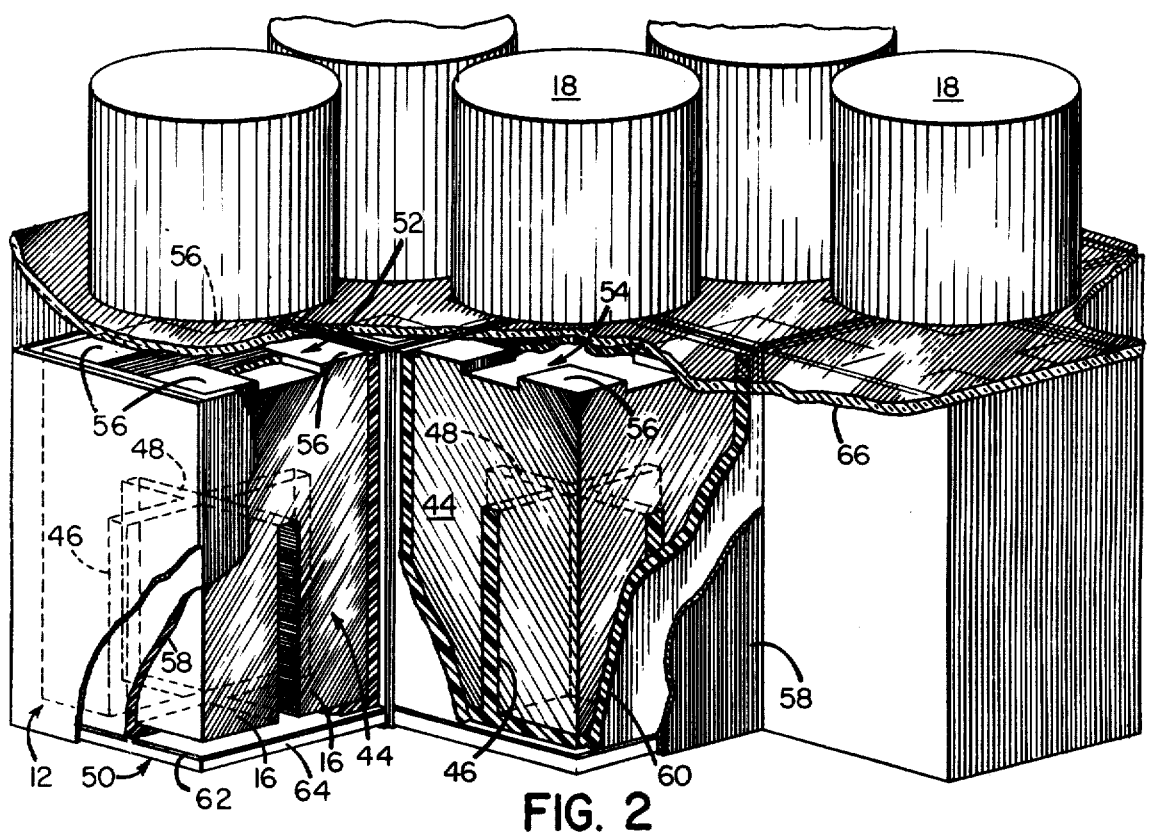
FIG. 2 is a perspective view of the crystal detector array of FIG. 1.
Figure 3:
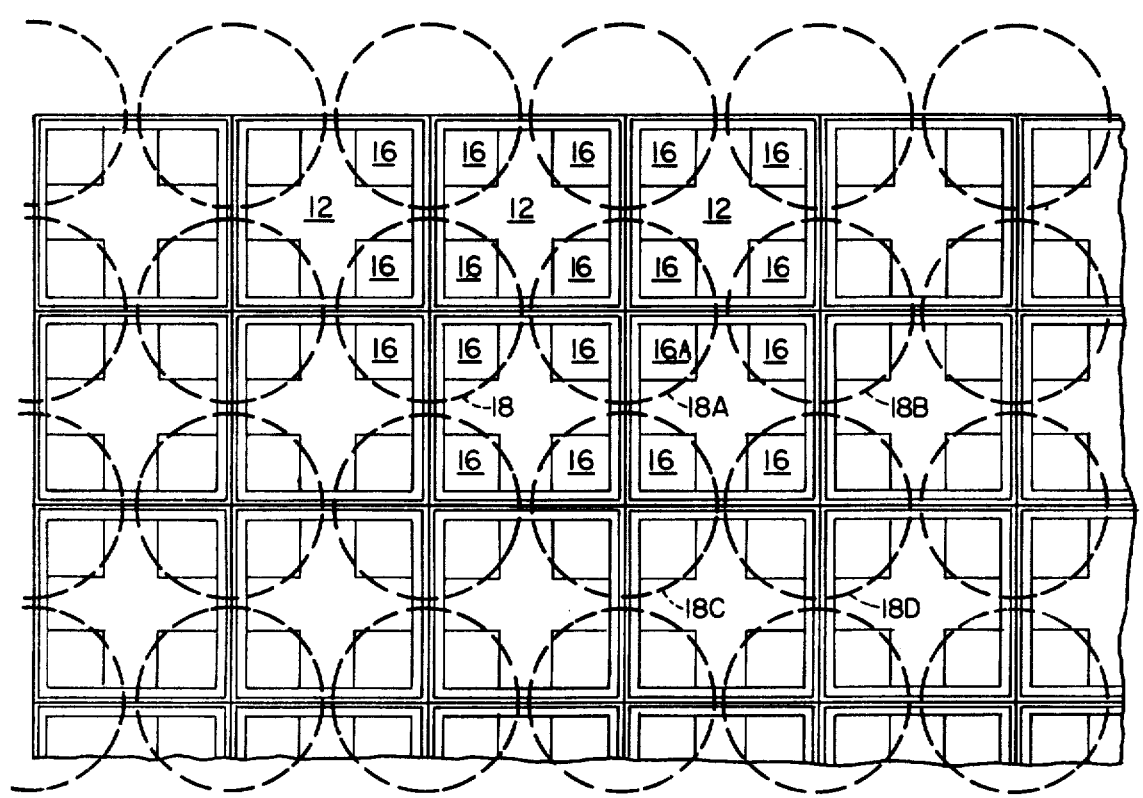
FIG. 3 is a schematic diagram showing the positional relationships among the crystal assemblies and photodetectors of FIG. 2.

Referring now to the drawings, FIG. 1 shows a radioactivity distribution detection system 10 having a plurality of crystal assemblies 12 disposed in an array 14 for sensing radioactive events at various locations within a specimen containing an unknown distribution or radioactivity. As best shown in FIGS. 2 and 3, each crystal assembly 12 has four scintillators 16, each scintillator having a unique address location in array 14. A scintillator 16, which is activated by sensing radioactivity, emits a light signal which is detected by a plurality of detectors 18, for example photomultiplier tubes that are superimposed on crystal assemblies 12 in such a manner that a plurality of the photomultiplier tubes are disposed over one scintillator 16 in each of four adjacent crystal assemblies 12. Data signals generated by a photomultiplier tube 18 monitoring an activated scintillator 16 in a particular crystal assembly 12 and the photomultiplier tubes monitoring the adjacent scintillators of the particular crystal assembly are processed in a processor 20 to provide a presentation of the distribution of the sensed events. In accordance with the teachings of the present invention, three photomultiplier tubes 18 determine the position of the activated scintillator 16 from which light is emitted in response to detection of a radioactive event.

In the illustrated embodiment, radioactivity distribution system 10 comprises a detector assembly 24 which includes a collimator 26, array 14 of crystal assemblies 12, and photomultiplier tubes 18. By way of example, collimator 26 is a multi-plane focused collimator characterized by at least two different focal lengths. A subject under diagnosis (not shown) is positioned on a programmable XY platform 28 which is in spaced relationship to detector assembly 24, a section of the subject under diagnosis being in registration with collimator 26. In response to command signals generated by a computer 30, scanning signals are generated by a driver control 32 which operates to move platform 28 in a specified scanning pattern. Individual scintillation events in detector assembly 24 are sensed and the coordinate position of each event is determined by the encoding arrangement now to be discussed.

Each scintillator 16 in array 14 has a unique address which is defined as being located in a particular row and column of the array. Data signals generated by photomultipliers 18 are processed in front-end electronics 34 which includes a decode logic unit 38 and a decode coincidence logic unit 42. The data signals at the outputs of photomultipliers 18 are decoded in the decode logic 38. In addition, the signals at the outputs of photomultipliers 18 are applied to data decode coincidence logic unit 42 which provides an indication that data signals have been detected from at least three adjacent photomultipliers.

As shown in FIGS. 2 and 3, with the exception of scintillators 16 at the edges of array 14, one photomultiplier tube 18 is associated with four scintillators, one scintillator in each of four crystal assemblies in adjacent rows and columns. One photomultiplier tube 18 is associated with two scintillators 16 at the edges of array 14 and one photomultiplier tube 18 is associated with one scintillator 16 at the corners of array 14. The structure of each crystal assembly is such that light from one scintillator 16 is coupled to four photomultiplier tubes 18. That is, most of the light from a scintillation in one scintillator 16 location in one crystal assembly 12 is sensed by one photomultiplier tube 18 that is superimposed on the activated scintillator. A smaller amount of light from the activated scintillator 16 is sensed by the two photomultiplier tubes 18 which are superimposed on the two scintillators 16 in the same crystal assembly 12 that are adjacent the activated scintillator. An even lesser amount of light from the activated scintillator 16 is sensed by the one photomultiplier tube 18 which is superimposed on the remaining scintillator 16 in the same crystal assembly. In this way, three photomultiplier tubes 18 determine the position of the activated scintillator 16 by the light emitted therefrom by pulse height weighting.

As previously indicated, each crystal assembly 12 includes four scintillators 16. As shown in FIG. 2, each crystal assembly 12 includes a body 44 composed of a scintillator crystal, for example a thallium activated sodium iodine crystal or a cesium iodine crystal. In right cross section, body 44 has a substantially square profile. In the illustrated embodiment of FIGS. 2 and 3, by way of example, the length and width of body 44 is approximately 2 cm and the height is approximately 4 cm for detection of gamma rays up to approximately 600 KeV. A pair of perpendicular slots 46 and 48 extend upwardly from the lower or receiving end 50 of body 44 for approximately seventy-five percent of the height of the body. In the illustrated embodiment, the height of slots 46 and 48 is approximately 3 cm and the width of each slot is approximately 1-2 mm. Slots 46 and 48 divide receiving end 50 into quadrants having substantially square profiles in right cross section, each quadrant defining one scintillator 16. The upper or transmitting end 52 of body 44 is cut away at 54 to form four exit windows 56, one exit window being in registration with one scintillator 16. The width of the cut away regions between adjacent parallel edges of exit windows 56 is approximately thirty percent of the width of body 44. This is, in the illustrated embodiment, the adjacent parallel edges of exit windows 56 are spaced apart approximately 0.6 cm. In an alternate embodiment, the interior edges of exit windows are other than straight edges, for example rounded edges. Body 44 is received within an open ended housing 58 which is composed of a metal such as stainless steel for example. Housing 58 has a substantially rectangular profile in right cross section which corresponds to the right cross-sectional profile of body 44. The length of housing 58 is slightly longer than the length of body 44, the sides of the housing extending a short distance beyond receiving end 50. A reflective material 60, for example magnesium oxide, is disposed in the spacing between housing 58 and body 44. Reflective material 60 is also placed in slots 46, 48 in the cut away regions between exit windows 56, and between body 44 and receiving end 50. A thin stratum 62, for example a 5 mil aluminum foil sheet, is superimposed on receiving end 50 and fitted between the inner faces of the sides of housing 58 which extend beyond the receiving end of body 44. An expoxy stratum 64 covers aluminum foil sheet 62. A glass stratum 66 is superimposed on transmitting ends 52 of crystal assemblies 12. Photomultiplier tubes 18 are positioned selectively on glass stratum 66. Reflective material 60 between exit windows 56 reduces the loss of light into the spaces between photomultiplier tubes 18.

Figure 4:
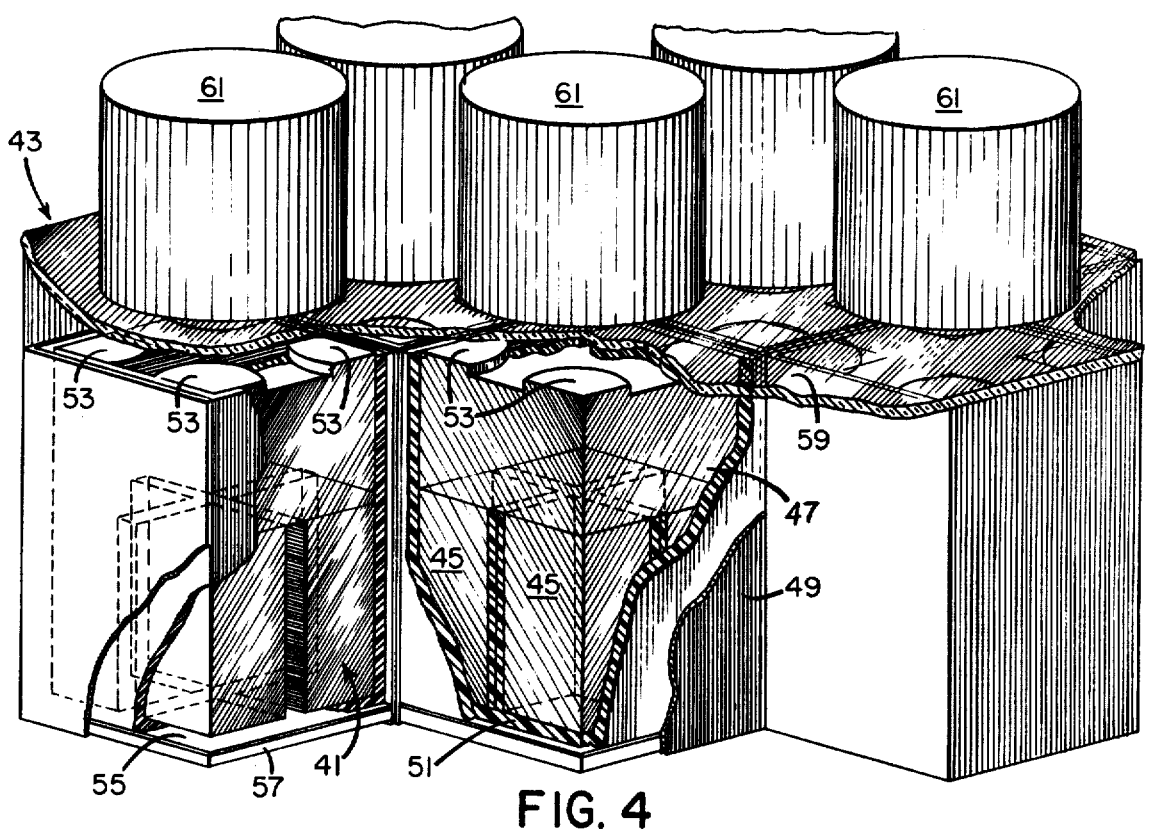
FIG. 4 is a perspective view of an alternative embodiment of the crystal detector.

Referring now to FIG. 4, there is shown a plurality of crystal assemblies 41 that are disposed in an array 43. Each crystal assembly 41, which is an alternate embodiment of crystal assembly 12, includes four individual scintillator crystals 45 and a glass body 47 that are packaged in an open ended housing 49. Each scintillator crystal 45, for example a thallium activated sodium iodine crystal or a cesium iodine crystal, has a substantially square profile in right cross section and each housing 49 has a substantially square profile in right cross section. Glass body 47, which has a substantially square profile in right cross section, is superposed on the upper or transmitting end of scintillator crystal 45 and is received within housing 49. A reflective material 51, for example magnesium oxide, is disposed between adjacent faces of each scintillator crystal 45, and between housing 49 and scintillator crystal 45 and glass body 47. The upper end of glass body 47 is cutaway to form four quater round exit windows 53, one of each exit window in registration with one of each scintillator crystals 45. In alternate embodiments, the interior edge of exit windows 53 are other than rounded edges, for example straight edges and the exit windows have a substantially rectangular profile as shown in FIG. 2. Reflective material 51 is disposed also between exit windows 53 and between housing 49 and the lower or receiving end of scintillator crystals 45. A thin stratum 55, for example a 5 mil aluminum foil sheet, is superposed on the receiving end of each four scintillator crystals 45 in each housing 49. An epoxy stratum 57 covers aluminum sheet 55. A glass stratum 59 having a substantially square profile corresponding to the profile of housing 49 is fitted over the transmitting end of each housing. Photomultiplier tubes 61 are positioned on glass strata 59 in registration with selected ones of scintillator crystals 45 in the manner described in connection with FIGS. 2 and 3.

As described in U.S. Pat. No. 4,044,332, incorporated herein by reference, all acceptable data sensed by scintillators 16 in array 14 is accumulated and stored in a buffer memory 68. Each event sensed at a particular row and column position, or XY position of the subject corresponding to the XY position of platform 28 with respect to array 14, is addressed into memory 68 and accumulated to previous events having the same address. The XY address of each scintillator 16 is determined by the corresponding photomultiplier tubes 18 output signals. For example, if scintillator 16A (FIG. 3) is activated, the light flash emitted therefrom is sensed by photomultiplier tubes 18A, 18B, 18C and 18D. The highest light flash intensity is detected by photomultiplier tube 18A; a smaller light flash intensity is presented to photomultiplier tubes 18B and 18C; and a negligible light flash intensity falls on photomultiplier tube 18D. The currents from photomultiplier tubes 18A, 18B, 18C and 18D are summed and decoded in decode logic 38 to obtain the unique address location of scintillator 16A. In this manner, three photomultiplier tubes 18, (18A, 18B and 18C) determine the address location of the light flash emitted from the activated scintillator 16 by detection of the light flash and not by pulse height weighting. In the illustrated example, if only photomultiplier tube 18A registers a light flash, most likely such a flash is a dark current pulse and will not be recognized as a legitimate interaction from a radioactive particle by decode coincidence logic 42.

The address location of each activated scintillator 16 event is accumulated to previous events having the same address location. The number of events stored at a given address is the number of recorded disintegrations having originated within the monitored subject at a point, the XY location of which corresponds to the given address. Following the accumulation period, the accumulated date in raw digital form is fed to computer 30 and stored in corresponding address locations. The data in computer 30 is normalized into Gray scale coded signals as a function of the greatest number of detected events at any one address location and fed to a halftone conversion unit 70. Signals generated by halftone conversion unit 70 are applied to a display 72 for controlling the number of dot picture elements per unit area at XY display locations which correspond to the address locations.

In the illustrated embodiment, array 14 is mounted in spaced registration with collimator 26 which includes a plurality of tapered collimator bores 74. Each scintillator 16 is disposed in registration with one taped collimator bore 74. As previously indicated, sensed events at each unique address are accumulated in memory 68. That is, as platform 28 is moved in a scanning sequence, the number of scintillation events for each step of the scanning sequence is accumulated in a corresponding XY location in memory 68. Upon completion of each scanning step, the events stored in memory 68 for that XY location of the subject with respect to detector 24 is fed to computer 30, memory 68 is cleared and is readied for reception of new data. Operation of the system is directed from a control panel 76 which may be a series of interconnected switching devices that are interconnected to computer 30 via a programmer 78. A manual data input 80, for example a keyboard, is provided for logging any pertinent data in a display 72.

Programmable XY platform 28 comprises a table 82 which is mounted to a slidable member 84. A rack 86 which engages a pinion 88 of a driver 90 is mounted to member 84. Member 84 is slidably received in guideways 92, 94 which are provided in parallel guides 96, 98, respectively, rack 86 being in parallel spaced relationship with guides 96, 98. Guideway 92 extends along the longitudinal axis of guide 96 and guideway 94 extends along the longitudinal axis of guide 98. Guides 96 and 98 are formed also with a pair of transverse guideways 100, 102 and 104, 106, respectively. Guideway 100 is in registration with guideway 104 and guideway 102 is in registration with guideway 106. Fixed guides 108 and 110 are slidably received in guideways 100, 102 and 104, 106 respectively. Fixed guides 108 and 110 are in parallel spaced relationship to one another and in perpendicular spaced relationship with guides 96, 98. Mounted to guides 96, 98 in parallel spaced relationship with guides 108, 110 is a rack 112 which engages a pinion 114 of a driver 116. It will be realized from the foregoing description that table 82, member 84 and rack 86 are slidable in a first direction within guideways 92, 94; and guides 96, 98 and rack 112 are slidable in a second direction within guideways 100, 102 and 104, 106; the first and second directions being mutually perpendicular to one another. For convenience, by way of example, the first and second directions will be referred to as the X and Y directions, respectively. That is, driver 90 moves table 82 in the X direction and driver 116 moves table 82 in the Y direction. Drivers 90 and 116, for example stepping motors, are controlled by signals generated by driver control 32 in response to command signals from computer 30. It is to be understood that platform 28 is movable also in the Z axis by means of jack screws 118, for example.

Computer 30 is programmed to move platform 28 in a scanning sequency of sixteen, eight or four incremental steps, each step being an integral multiple of the distance between adjacent scintillators 16. Each collimator bore 74 is used to limit the field of view of each scintillator 16 to a unique spatial segment of the specimen being diagnosed. In this manner, an image of the organ under diagnoses is obtained. The image is made up of a specified number of picture elements which correspond to the number of unique spatial segments isolated by multi-bore collimator 26. The shape and volume of each separate spatial segment in the specimen is defined by the geometry of each collimator bore 74. A description of the detailed electronic circuitry for providing the image of the specimen under diagnoses is found in U.S. Pat. No. 4,044,332 which has been incorporated herein.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A detector comprising a unitary body that is formed with a pair of intersecting perpendicular slots that extend inwardly from one end of said body to form four sensing heads in said body at said one end, each of said sensing heads positioned in one quadrant of said body, an opposite end of said body being cut away to form four elevated exit windows, one of each said exit windows in one of each said quadrants, one of each said sensing heads in registration with one of each said exit windows in one of each said quadrants.

2. The detector as claimed in claim 1 including a reflective material disposed within said slots.

3. The detector as claimed in claim 2 wherein said body is composed of a scintillation material and each said sensing head defines a scintillator.

4. A detector assembly comprising:
 (a) a housing having opened ends;
 (b) a unitary body composed of a scintillation material disposed within said housing, said body formed with inwardly extending, perpendicular slots which divide one end of said body into four sensing heads, a portion of an opposite end of said body cut away to form four exit windows at said opposite end of said body, one of each said sensing heads in registration with one of each said exit windows in one quadrant of said body, each said sensing head defining a scintillator; and (c) a reflective material disposed within said slots, in said cut away portion of said body between said exit windows, and in the space between said housing and said body.

5. The detector assembly as claimed in claim 4 including a metallic stratum superposed on said sensing heads and an epoxy stratum superposed on said metallic stratum.

6. A detector array comprising:

(a) a plurality of housings arranged in an array;

(b) a body composed of a scintillation material captively held within each of said housings, each said body formed with longitudinally extending slots which divide one end of said body into equal quadrants, each of said quadrants defining a scintillator, four exit windows formed in each said quadrant at an opposite end of said body, one of each said exit windows in registration with one of each said scintillators: and (c) a plurality of detectors superposed on said exit windows, certain ones of said detectors superposed equally on four exit windows of four adjacent housings, said certain ones of said detectors superposed on only one exit window of each of said adjacent housings.

7. The detector array as claimed in claim 6 including a reflective material disposed between said body and housing, in said slots, and between said exit windows.

8. The detector array as claimed in claim 7 wherein each of said detectors is a photomultiplier tube.

9. A system for presenting a representation of radioactivity distribution within a specimen, said system comprising:

(a) a plurality of housings arranged in an array of rows and columns;

(b) a unitary body composed of a scintillation material captively held within each of said housings, each said body formed with longitudinally extending slots which divide one end of said body into equal quadrants, each of said quadrants defining a scintillator, four exit windows formed in each said quadrant at an opposite end of said body, one of each said exit windows in registration with one of each said scintillators in one of each said quadrants, said scintillators defining an array of rows and columns for sensing radioactive events within the specimen;

(c) a plurality of dectors superposed on said exit windows, certain ones of said detectors superposed equally on four exit windows of four adjacent housings, said certain ones of said detectors superposed on only one exit window of each of said adjacent housings;

(d) decode means connected to said detectors for decoding signals generated by said detectors, said decode means generating data signals defining address locations of said sensors, each said scintillator having a unique address location;

(e) processing means connected to said decode means for accumulating sensed events at each of said address locations; and (f) display means connected to said processing means for presenting a representation of radioactivity distribution within the specimen.

10. The system as claimed in claim 9 including a reflective material disposed in said slots, between said housing and body received therein, and between said exit windows, each of said scintillators activated and generating a light signal in response to detection of a radioactive event within the specimen, said light signal generated by said activated scintillator in one of said bodies being shared by said detectors superposed on adjacent scintillators in said one body.

* * * * *